(12) United States Patent
Liu et al.

(10) Patent No.: US 6,266,660 B1
(45) Date of Patent: Jul. 24, 2001

(54) SECONDARY INDEX SEARCH

(75) Inventors: Lee-Chin Hsu Liu, San Jose, CA (US); Kenji Yoneda, Tokyo (JP)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/135,311

(22) Filed: Jul. 31, 1998

(51) Int. Cl.⁷ .................................................. G06F 17/30
(52) U.S. Cl. ...................... 707/3; 707/1; 707/2; 707/4; 707/100; 707/201
(58) Field of Search ............... 707/1, 2, 3, 4, 707/100, 201; 717/1, 2, 5; 382/232, 283

(56) References Cited

U.S. PATENT DOCUMENTS

| | | | | |
|---|---|---|---|---|
| 5,499,359 | * | 3/1996 | Vijaykumar | 707/201 |
| 5,745,896 | * | 4/1998 | Vijaykumar | 707/100 |
| 5,752,243 | * | 5/1998 | Reiter et al. | 707/3 |

* cited by examiner

*Primary Examiner*—Thomas Black
*Assistant Examiner*—Diane D. Mizrahi
(74) *Attorney, Agent, or Firm*—Charles A. Johnson; Mark T. Starr

(57) ABSTRACT

A secondary index search in a relational database system compares primary key selection criteria against a primary key value stored in a secondary index record that satisfies secondary key selection criteria instead of searching a primary index for a primary key value that satisfies the primary key selection criteria.

15 Claims, 3 Drawing Sheets

SECONDARY INDEX SEARCH

FIELD OF THE INVENTION

The present invention is related to database systems and in particular to searching in relational database systems.

BACKGROUND OF THE INVENTION

In a relational database, records are stored as rows (tuples) within tables (relations), with each data field in a record represented as a column in the table. The table data is commonly stored in a balanced tree structure (B-tree), and can be associated with other B-tree structures used to sort the data on selected fields of the record.

Primary key B-trees, which are also called "base tables," are B-trees sorted according to a "primary key" field. For any given table of data, one field or group of fields of the record is selected as the primary key. The primary key must contain data unique to that record. For example, in a record defined to contain a person's name, social security number, and data of birth, the social security number could be selected as the primary key field since this will contain unique data for each record. In a primary key B-tree structure, the top (root) and intermediate nodes of the B-tree are index pages which contain index records that determine how the tree is to be traversed to find the requested data record(s). Each index record contains a primary key value and a page number. The page number indicates the page in the next level of the B-tree that contains records with a primary key value which is less than or equal to the primary key value in the current index record. The bottom (leaf) nodes, or "data pages," contain the data records.

The user may also decide that it is valuable to create a B-tree on a non-unique "secondary index" field of the table data. The resulting B-tree structure is called a "secondary index B-tree". Although only a single primary key B-tree exists for a given table, multiple secondary index B-trees may be created as the user deems necessary. Like a primary key B-tree, a secondary index B-tree contains root and intermediate nodes that indicate how the secondary index B-tree is to be traversed to find the requested secondary index value. In a common implementation of a secondary index B-tree, the secondary index B-tree does not contain data records at the leaf nodes. Instead, the leaf nodes contain records which correlate secondary index values to records in the primary key B-tree. The records of the secondary index B-tree records store the primary key values of one or more records that have the designated secondary key values. The primary key B-tree is searched using these primary key values to retrieve the associated data records.

A "select" query command retrieves records having columnar values that satisfy certain selection criteria. A select query is commonly a boolean operation specifying multiple data fields that must meet a certain criteria. A select query is most efficient when all the data fields in the selection criteria are keys for a primary or secondary index B-tree. A sample query is used to illustrate select query processing for a table that contains employee records when the fill name of the employee is used as the primary key of the employee table and the employee's salary is used as a secondary key: "Select employee from employee table where last-name=Smith and salary >$50,000."

The select query process searches the secondary index B-tree for the salary field and creates a set of secondary index records for employees paid more than $50,000. The select query process uses the primary key values stored in the secondary index records in the set to find the corresponding primary index records in the primary index B-tree for the employees paid more than $50,000. The select query process searches these primary index records for employees with the last name of Smith, thus completing the query. This select query process must perform a minimum of two file I/Os to retrieve the leaf node page containing the secondary index records, a minimum of two I/Os to retrieve the index page containing the primary index records that correspond to the secondary index records, and a minimum of one I/O to retrieve the employee data records themselves. When retrieving records from a large database, the number of file I/O to find records that satisfy the selection criteria can become very large and costly in terms of performance.

A select query may require joining records from more than one table into a set of records that satisfy the criteria. However, all select operations begin by searching for records from a single table that meet the selection criteria; records from other tables are then searched for as required. Because select operations are the basic building blocks of all queries issued against a relational database in a transactional environment, increasing the speed of the search process results in direct improvement in the overall performance of the database system.

Therefore, there is a need for an search process that reduces the number of file I/O's necessary to find records satisfying selection criteria for a database query and thus increases the performance of the database system.

SUMMARY OF THE INVENTION

A secondary index search searches for a secondary index record stored in a database that satisfies a secondary key value specified in a selection criteria. The secondary index search compares a value for a primary key stored in the secondary index record against a primary key value in the selection criteria. If the primary key value in the secondary index record satisfies the selection criteria, the secondary index search selects the data record identified by the primary index value. The secondary index search process is repeated until no secondary index record is found that satisfies the secondary key value of the selection criteria. The secondary index records and the data records are stored in secondary index and primary index balanced trees, respectively. The balanced trees are searched by the secondary index search process to locate secondary index and data records.

In another aspect of the invention, the secondary index search creates a set of secondary index records that satisfy the primary and secondary key values of the selection criteria and selects the data record identified by the primary key value for each secondary index record in the set.

Because the secondary index search compares the primary key value stored in the secondary index records against the primary key value of the selection criteria and not against the primary key value in the primary index balanced tree, the secondary index search only accesses the primary balanced tree when the data record identified by the primary key satisfies both the secondary and primary key values of the selection criteria. Thus, the secondary index search reduces the number of searches in the primary balanced tree. Fewer searches means fewer file I/Os and consequently faster performance for a select query using the secondary index search of the present invention.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

The leading digit(s) of reference numbers appearing in the FIGS. corresponds to the FIG. number, with the exception that the same reference number is used throughout to refer to an identical component which appears in multiple FIGS. Signals and connections may be referred to by the same reference number or label, and the actual meaning will be clear from its use in the context of the description.

Operating Environment

A secondary index search secondary index search is described in detail below in terms of computer-executable processes. The processes can be implemented in software, hardware or firmware without departing from the scope of the invention. Any standard computer operating environment, such as generally shown in FIG. 1, provides the underlying infrastructure of processing and file input/output (I/O) operations necessary for the execution of the invention.

Figure 1:
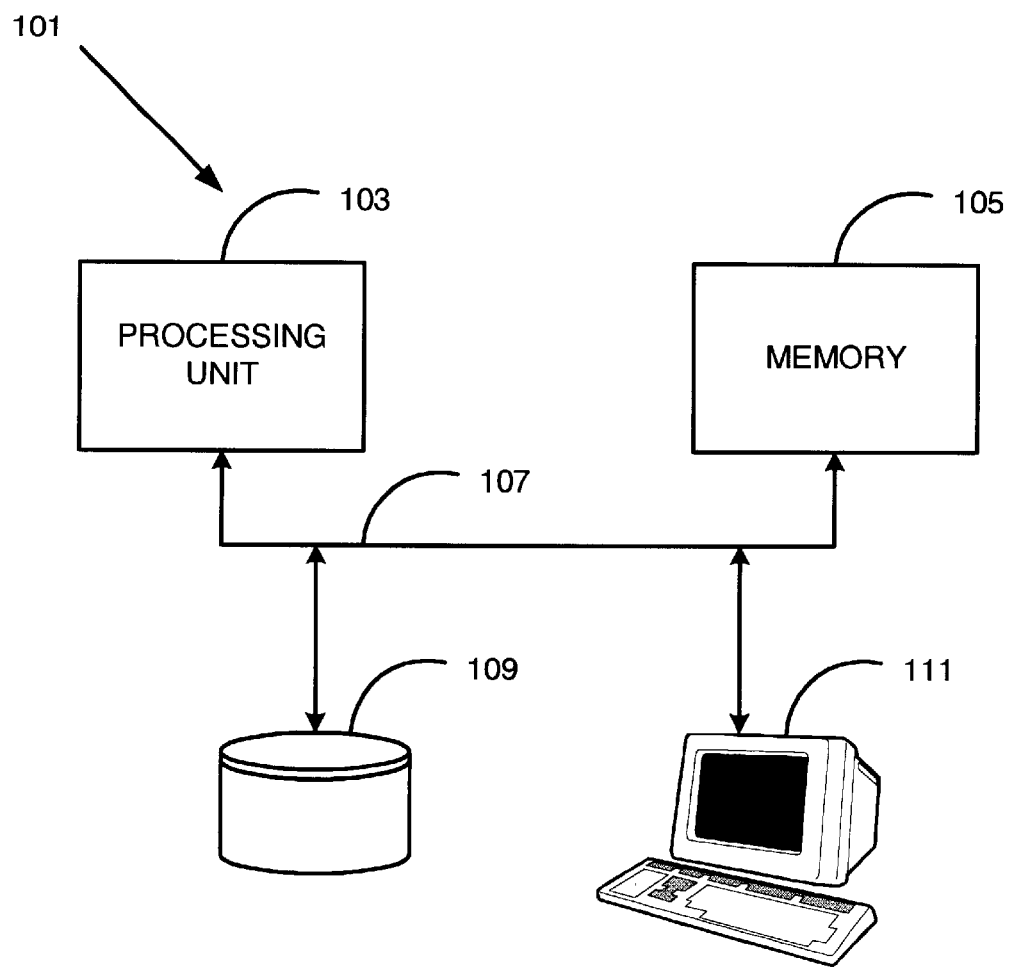
FIG. 1 is a block diagram of one embodiment of an operating environment suitable for executing the embodiments of the invention.

FIG. 1 shows a computer 101 having a processing unit 103 coupled to a memory 105 through a system bus 107. Processing unit 103 can be a single central processing unit (CPU) or multiple processing units coupled together to form a parallel processing unit, as well-known to one skilled in the art. A storage device 109 is coupled to the system bus 107 to store and access computer programs and data on computer-readable media. The media for storage device 109 can be fixed, such as a hard disk, or removable, such a tape. A display device 111 is also connected to the system bus 107. While FIG. 1 shows a single computer 101, those of skill in the art will readily recognize that the processes of the invention can also be distributed among multiple computers connected together, which may or may not share a common memory, and can be executed from computer-readable media located on one or many of the computers.

Data Structures

Figure 2:
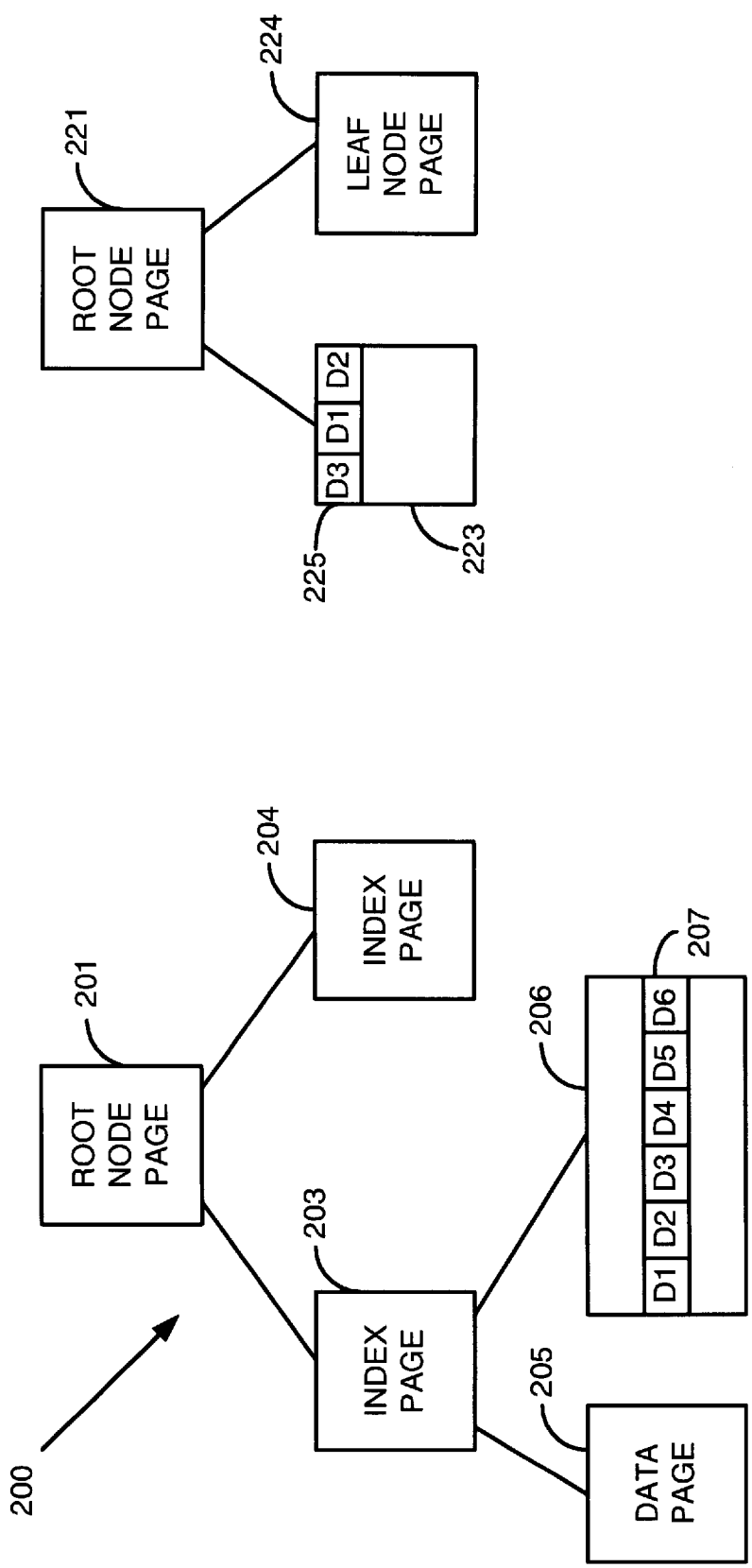
FIG. 2 is a block diagram of primary and second index data structures for a relational database that employs one embodiment of the invention.

The secondary index search compares selection criteria against a primary key value stored in a secondary index record that satisfies the selection criteria instead of searching a primary index for a value that satisfies the selection criteria. The FIG. 2 shows a block diagram of a table with index structures suitable for use with the secondary index search of the present invention. Table 200 is indexed on two keys, a primary key of combined fields D1 and D2, and a secondary key of D3. Each index is stored as a balanced tree (B-tree). The primary index B-tree contains a root node page 201 which points to two intermediate index pages 203 and 204 with each index page pointing to data pages such as data pages 205 and 206 as pointed to by index page 203. Data pages hold data records such as data record 207. The secondary index B-tree contains a root node page 221 which points to two leaf pages 223 and 224. A leaf page holds secondary index records such as secondary index record 225. The secondary index record 225 comprises a field that contains a secondary key value D3 and two fields that contain the primary key value D1 and D2 for the data record associated with the secondary key value D3.

In the following example, table 200 is a table of employee records with the employee's last name stored in field D1, the first name stored in field D2, the employee's salary stored in D3, the employee's social security number stored in D4, the employee's department stored in D5, and the employee's location stored in D6. Record 207 is for John Smith who makes $51,000 a year, works in Marketing in New York and whose social security number is 123-45-6789. The secondary index record for John Smith contains "$51,000 Smith John". The example selection query is "Select employee from employee table where last-name=Smith and salary >$50,000."

The secondary index search searches the secondary index B-tree to find a secondary index record with a value in D3 that is greater than $50,000. If a secondary index record is found that satisfies the selection criteria on the secondary key, the secondary index search compares the value of D1 in the secondary index record with the primary key value of the selection criteria. Thus, since secondary index record 225 meets the secondary key selection criteria, the value of D3 is compared against "Smith." Since D3 contains "Smith," the secondary index search uses the primary key D1 and D2 from the secondary index record 225 to retrieve the data record 207 using the primary B-tree. Because the secondary index search uses the primary key value stored in the secondary index records to determine if the primary key portion of the selection criteria is satisfied, the secondary index search reduces the number of searches in the primary B-tree. Fewer searches means fewer file I/Os and consequently faster performance for a select query using the secondary index search of the present invention.

Logic Flow

Figure 3:
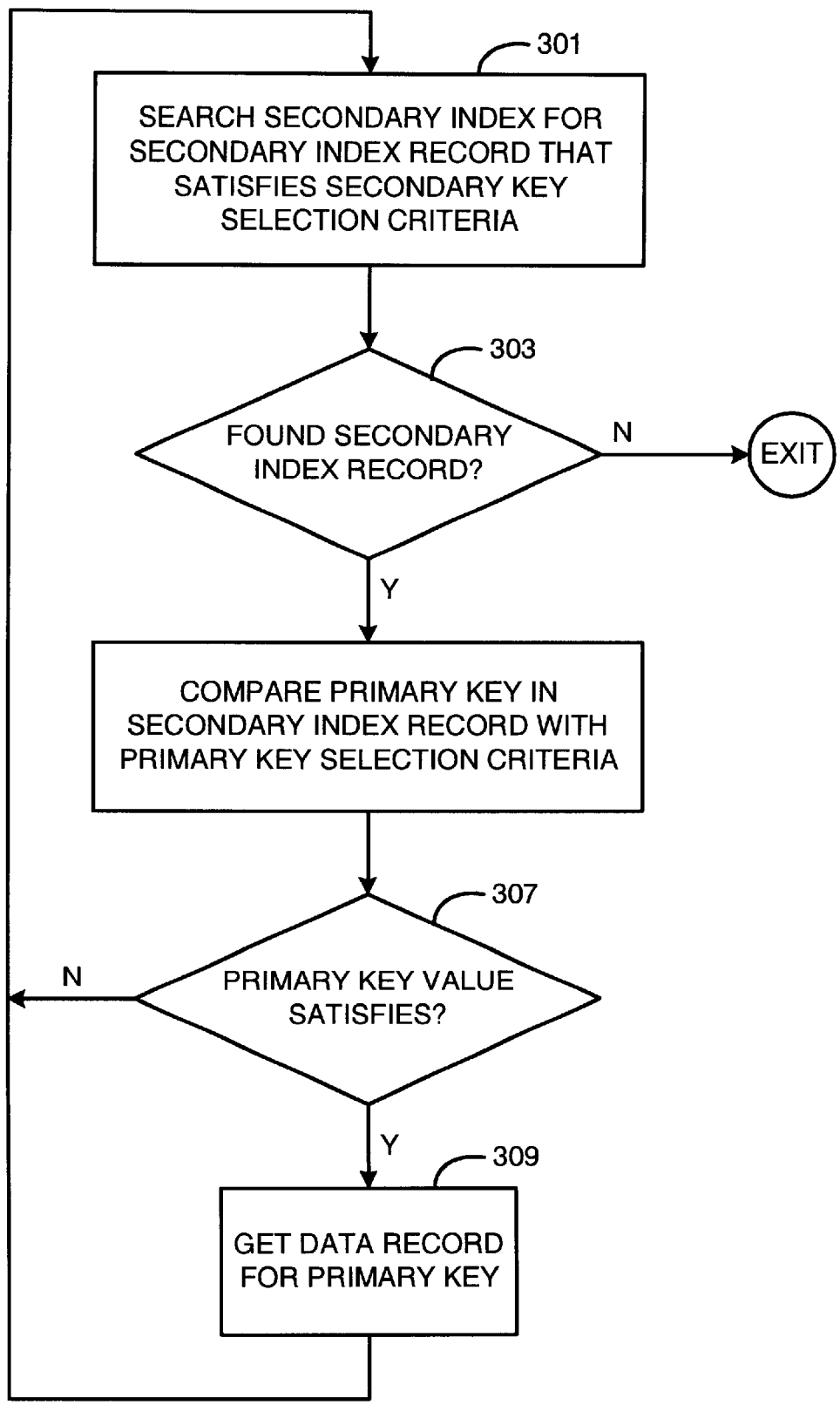
FIG. 3 is a logic flow diagram of one embodiment of the invention.

Logic flow through one embodiment of the secondary index search is shown in FIG. 3. The secondary index search process begins by searching the secondary index B-tree structure to find a secondary index record that satisfied the secondary key value of the selection criteria (step 301). If no record is found (step 303), the process exits. If a records is found, the process compares the value of the primary key that is stored in the secondary index record with the primary key value of the selection criteria (step 305) to determine if the primary key values are the same, i.e. the selection criteria is satisfied. If the primary key value satisfies the selection criteria (step 307), the process retrieves the data record identified by the primary key (step 309) and then searches the secondary index B-tree for additional secondary index records that satisfy the secondary key value of the selection criteria (step 301). If the primary key does not satisfy the selection criteria, the process returns to the secondary index B-tree to search for additional secondary index records (step 301). The data records retrieved by the process are delivered as the result of the select query.

Alternate embodiments which initially collect together the secondary index records that satisfy the secondary value of the search and/or the secondary index records that satisfy both the secondary and primary values of the search for processing will be readily apparent to one skilled in the art and are within the scope of the invention.

Conclusion

The secondary index search of the present invention reduces the number of file I/O operations on the primary balanced tree by only accessing the primary balanced tree when the data record identified by the primary key satisfies both the secondary and primary key values of the selection criteria. Fewer file I/Os means faster performance for a select query using the secondary index search of the present invention.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. In a computer system, a method for selecting a data record from a database using a selection criteria that specifies values for a primary key and a secondary key of the data record where the database stores the values of the primary key and the secondary key for the data record in a secondary index record for the data record, the method comprising the steps of:

searching the database for a secondary index record that satisfies the secondary key value of the selection criteria;

comparing the primary key value of the selection criteria against the primary key value stored in the secondary index record that satisfies the secondary key value of the selection criteria; and selecting a data record identified by the primary key value in the secondary index record if the primary key value satisfies the primary key value of the selection criteria.

2. The method of claim 1, wherein the steps of searching, comparing and selecting are repeatedly performed until no secondary index record satisfies the secondary key value of the selection criteria.

3. The method of claim 1, wherein the secondary index record is stored in a secondary index balanced tree structure and the step of searching the database searches the secondary index balanced tree structure.

4. The method of claim 1, wherein the data record is stored in a primary index balanced tree structure and the step of selecting a data record searches the primary index balanced tree structure.

5. A computer-readable medium having computer-executable instructions for performing the steps of:

searching a database table indexed on a primary and a secondary key using a secondary key value in a selection criteria to locate a secondary index record that satisfies the secondary key value of the selection criteria;

comparing a primary key value of the selection criteria against a primary key value stored in the secondary index record that satisfies the secondary key value of the selection criteria; and selecting a data record identified by the primary key value in the secondary index record if the primary key value satisfies the primary key value of the selection criteria.

6. The computer-readable medium of claim 5, wherein the steps of searching, comparing and selecting are repeatedly performed until no secondary index record satisfies the secondary key value of the selection criteria.

7. The computer-readable medium of claim 5, wherein the secondary index record is stored in a secondary index balanced tree structure and the step of searching the database searches the secondary index balanced tree structure.

8. The computer-readable medium of claim 5, wherein the data record is stored in a primary index balanced tree structure and the step of selecting a data record searches the primary index balanced tree structure.

9. In a computer system, a method for selecting data records from a database using a selection criteria that specifies values for a primary key and a secondary key of the data record where the database stores the values of the primary key and the secondary key for the data record in a secondary index record for the data record, the method comprising the steps of:

creating a set of secondary index records that satisfy the primary and secondary key values in the selection criteria; and selecting a data record identified by the primary key value for each secondary index record in the set.

10. The method of claim 9, wherein the secondary index records are stored in a secondary index balanced tree structure and the step of searching the database searches the secondary index balanced tree structure.

11. The method of claim 9, wherein the data record is stored in a primary index balanced tree structure and the step of selecting a data record searches the primary index balanced tree structure.

12. A secondary index search for selecting a data record from a database using a selection criteria that specifies values for a primary key and a secondary key of the data record where the database stores the values of the primary key and the secondary key for the data record in a secondary index record for the data record, the secondary index search comprising:

search means for searching the database for a secondary index record that satisfies the secondary key value of the selection criteria;

comparison means for comparing primary key values, wherein the primary key value of the selection criteria is compared against the primary key value stored in the secondary index record found by the searching means; and retrieval means for retrieving a data record, wherein the primary key value in the secondary index record identifies the data record to be retrieved when the comparision means indicates that the selection criteria is satisfied.

13. The secondary index search of claim 12, wherein the search means, the comparision means, and the retrieval means operate until the search means finds no secondary index record that satisfies the secondary key value of the selection criteria.

14. The secondary index search of claim 12, wherein the secondary index record is stored in a secondary index balanced tree structure and the search means searches the secondary index balanced tree structure.

15. The secondary index search of claim 12, wherein the data record is stored in a primary index balanced tree structure and the retrieval means locates the data record to be retrieved using the primary index balanced tree structure.

* * * * *